3,376,312
4,4-DIPHENYL-CYCLOHEXYLAMINES AND DERIVATIVES THEREOF
Richard Unger, Siegmund Sommer, Ernst Schorscher, and Hans-Joachim Eneakel, Darmstadt, Germany, assignors to E. Merck A.G., Darmstadt, Germany
No Drawing. Filed Dec. 13, 1965, Ser. No. 513,586
Claims priority, application Germany, Dec. 15, 1964, M 63,487
17 Claims. (Cl. 260—326.87)

ABSTRACT OF THE DISCLOSURE 4,4-diphenyl-cyclohexylamines and derivatives thereof as therapeutic agents, particularly for effecting spasmolytic or cholinolytic activities.

---

This invention relates to novel chemical compounds, in particular to 4,4-diphenyl-cyclohexylamines.

An object of the invention, therefore is to provide novel 4,4-diphenyl-cyclohexylamines.

Another object is to provide several alternative processes for producing such compounds, as well as novel chemical intermediates produced thereby.

A further object is to provide pharmaceutical compositions based on 4,4-diphenyl-cyclohexylamines.

A still further object is to provide processes of administering 4,4-diphenyl-cyclohexylamines in order to effect physiological and/or therapeutic activities.

To attain the objects of this invention there are provided 4,4-diphenyl-cyclohexylamines of Formula I as well as the acid addition salts and quaternary ammonium compounds thereof:

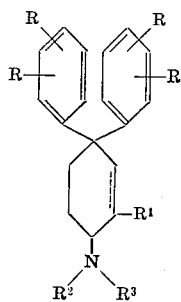

wherein:
each R on each phenyl group can represent hydrogen, alkyl of 1–4 carbon atoms, lower alkoxy such as methoxy, ethoxy, hydroxy, halogen such as fluorine or chlorine; and two R moieties on each phenyl can represent methylene dioxy,
$R^1$ represents H, alkyl, alkenyl or alkynyl of respectively up to 6 carbon atoms, and
$R^2$ and $R^3$ each represents H, alkyl, or alkenyl of respectively up to 8 carbon atoms, cycloalkyl of 3–8 carbon atoms, or aralkyl whose aliphatic portion contains 1–4 carbon atoms, and of which the aromatic portion is preferably unsubstituted hydrocarbon or it can be substituted in the same manner as the phenyl groups present in the 4-position, and wherein the residues $R^2$ and $R^3$ together with the nitrogen atom can also form a pyrrolidine or piperidine ring which is optionally substituted by a methyl or ethyl group, and
the dashed line in the 2,3-position indicates the optional presence of a double bond.

These compounds possess valuable pharmacological properties, particularly exhibiting spasmolytic and cholinolytic effects. Some cause increasing flow through the coronaries, in addition; this latter effect is particularly exhibited by those compounds of the Formula I above in which R is H, $R^1$ is H or lower alkyl (up to 4 carbon atoms), $R^2$ and $R^3$ are both methyl and there is no double bond in 2,3-position.

To illustrate such effects, 1-isopropylamino-4,4-diphenyl-cyclohexane and 1-(N-methyl-N-isopropylamino)-4,4-diphenyl-cyclohexane, tested on an isolated rat intestine, exhibited approximately 9 to 10 times the spasmolytic effect of Eupaverin; whereas these same compounds of this invention exhibited about the same cholinolytic efficaciousness and duration of activity as Atropin sulfate (tested on an isolated guinea pig intestine). This combination of a strong prolonged cholinolytic effect taken together with a strong spasmolytic activity component (the latter being present in most of the known cholinolytics to a slight degree or not at all) is considered a particular advantage. Furthermore, the substances are well resorbed from the stomach-intestinal tract, in contradistinction to Eupaverin, as well as to known cholinolytics with quaternary nitrogen.

To produce the 4,4-diphenyl-cyclohexyl-amines of Formula I, as well as the acid addition salts and quaternary ammonium salts thereof, the following processes can be used:

(1) A reducing agent is employed to treat a compound of Formula II (in Formulae II to V, $R^1$ to $R^3$ have the above-indicated meanings, the phenyl groups in the 4-position can be substituted by R groups as mentioned above, and a double bond can be present in the 2,3-position of the cyclohexane ring)

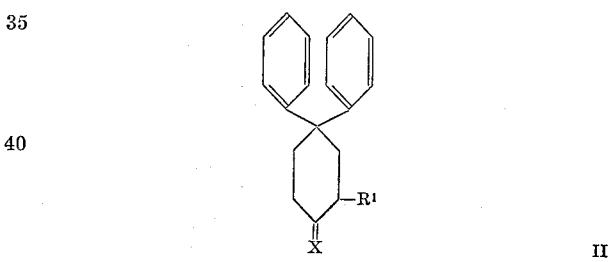

wherein:
X represents H, $-NO_2$; $=NOH$; $=NR^3$; H, $-N=R'$; H, $-NR^2$-acyl; or another residue reductively convertible into the group $NR^2R^3$; and
R' represents alkylidene of up to 8 carbon atoms, cycloalkylidene of 3–8 carbon atoms, or aralkylidene, whose aliphatic portion contains up to 4 carbon atoms, and whose aromatic portion can be substituted analogously to the phenyl groups present in the 4-position, or
an enamine of Formula III

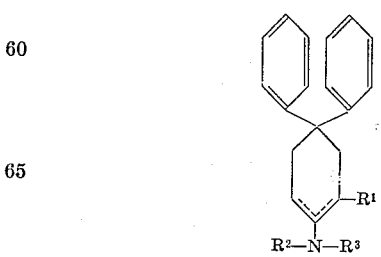

wherein the dotted line means that there is a double bond present in one of the thus-designated positions;

(2) A compound of Formula IV

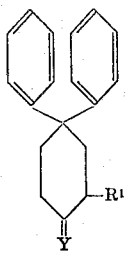

wherein:

Y represents H, OH; H, lower alkoxy; H, Hal, or =O and Hal represents Cl, Br, or I, is treated with a base of Formula V $$R^2R^3NH \qquad (V)$$

or with a salt of such a base, optionally in the presence of a reducing agent;

(3) In a compound having the basic structure of Formula I containing one or more hydroxy groups in a functionally modified form and/or having its amino group present in a functionally modified form there is liberated the hydroxy and/or amino group or groups;

(4) A primary or secondary amine of Formula I ($R^2$=H) is treated with alkylating agents;

(5) Compounds of Formula I are converted into their physiologically acceptable acid addition salts or quaternary ammonium salts, respectively, by treatment with an acid or an alkylating agent, respectively.

The residue $R^1$ represents, besides hydrogen, preferably methyl or ethyl; however, it can also be, for example, propyl, isopropyl, butyl, isobutyl, sec.-butyl, tert.-butyl, n-amyl, isoamyl, n-hexyl, isohexyl, allyl, or propargyl. The residues $R^2$ and $R^3$ preferably represent hydrogen, methyl, ethyl, propyl, isopropyl, n-butyl, sec.-butyl, tert.-butyl, n-amyl, isoamyl, 2-methyl-butyl-(1), pentyl-(2), pentyl-(3)-, 3-methyl-butyl-(2), neopentyl, tert.-amyl, n-hexyl, isohexyl, n-heptyl, n-octyl, allyl, buten-(1)-yl-(3), buten-(2)-yl-(1), buten-(3)-yl-(1), propargyl, cyclopropyl, cyclobutyl, cyclopentyl, cyclohexyl, cycloheptyl, cyclooctyl, benzyl, o-, m-, or p-methylbenzyl, 1- or 2-phenylethyl, 3-phenylpropyl-(1), 4-phenylbutyl-(1), 4-phenylbutyl-(2), p-methoxybenzyl. Together with the nitrogen atom, the residues $R^2$ and $R^3$ can preferably form a pyrrolidine, piperidine, 2-, or 3-methyl-pyrrolidine or 2-methyl-piperidine ring.

Preferred substituted phenyl residues in the 4-position or in the aromatic portion of the residues $R^2$ and $R^3$ are the following: 3,4-methylenedioxy-phenyl, o-, m-, and p-tolyl, o-, m-, and p-ethylphenyl, o-, m-, and p-methoxyphenyl, 2,3- and 3,4-dimethoxyphenyl, o-, m-, and p-ethoxyphenyl, o-, m-, and p-hydroxyphenyl, o-, m-, and p-chlorophenyl, and 3-methoxy-4-hydroxyphenyl.

As the acyl groups in the residue X, basically all acyl groups can be utilized which are reductively convertible into the residue $R^3$, primarily formyl, acetyl, propionyl, butyryl, isobutyryl, valeryl, isovaleryl, caproyl, enanthoyl, caprylyl, acryloyl, benzoyl, p-methoxybenzoyl, phenylacetyl, 2-phenylpropionyl, 3-phenylbutyryl.

R' represents preferably methylene, ethylidene, propylidene, isopropylidene, butylidene - (1), butylidene - (2), benzylidene, 2-phenylethylidene, 4-phenylbutylidene-(2).

The residue X can also represent other residues which are reductively convertible into the group $NR^2R^3$, for example =NCl, $NR^2R^3 \to O$, an azo group, $N_3$, NCO, NCS, a hydrazono group which can optionally be substituted, for example $=N-NH-C_6H_4-(p)-SO_3H$ or

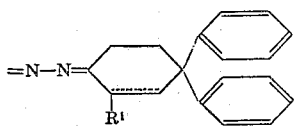

Such groups as well as others that will occur to chemists are to be considered as chemical equivalents of the specially defined X groups.

With respect to the substituent Y, as lower alkoxy groups, methoxy and ethoxy are preferred, but propoxy, isopropoxy, n-butoxy, and isobutoxy are very useful.

The amines of Formula I can be prepared by reducing the compounds of Formula II or III.

Preferred compounds of Formula II include the corresponding nitrocyclohexanes, such as 1-nitro-4,4-diphenyl-cyclohexane;

cyclohexanone-oximes, such as 4,4-diphenyl-,
2-methyl-4,4-diphenyl-,
2-ethyl-4,4-diphenyl-,
2-isopropyl-4,4-diphenyl-,
4,4-bis-o-tolyl-,
4,4-bis-m-tolyl-,
4,4-bis-p-tolyl-,
4,4-bis-p-methoxyphenyl-,
4,4-bis-p-ethoxyphenyl-,
4,4-bis-p-hydroxyphenyl-,
4,4-bis-(3,4-dimethoxyphenyl)-,
4,4-bis-(3,4-methylene-dioxyphenyl)-,
4,4-bis-p-chlorophenyl-;

imines, such as 1-methylimino-,
1-ethylimino-,
1-propylimino-,
1-isopropylimino-,
1-n-butylimino-,
1-isobutylimino-,
1-sec.butylimino-,
1-n-amylimino-,
1-isoamylimino-,
1-n-hexylimino-,
1-n-heptylimino-,
1-n-octylimino-,
1-allylimino-,
1-cyclohexylimino-,
1-benzylimino-4,4-diphenylcyclohexane;
1-methyleneamino-,
1-ethylidene-amino-,
1-propylidene-amino-,
1-isopropylidene-amino-,
1-butyliden-(1)-amino-,
1-butyliden-(2)-amino-,
1-isobutylidene-amino-,
1-benzylidene-amino,
1-(2-phenyl-ethylidene-amino)-,
1-(4-phenyl-butylidene-(2)-amino)-4,4-diphenyl-cyclohexane;

hydrazones, such as 4,4-diphenylcyclohexanone-p-sulfophenylhydrazone;

azines, such as 4,4-diphenylcyclohexanone-azine;

acyl derivatives, such as 1-formamido-,
1-acetamido-,
1-propionamido-,
1-butyramido-,
1-isobutyramido-,
1-valeramido-, 1-isovaleramido-,
1-capronamido-,
1-enanthamido-,
1-caprylamido-,
1-acrylamido-,
1-benzamido-,
1-p-methoxybenzamido-,
1-phenylacetamido-,
1-(2-phenylpropionamido)-,
1-(3-phenylbutyramido)-,
1-N-methylacetamido-,
1-N-ethyl-propionamido-4,4-diphenyl-cyclohexane.

Also suitable are the 2,3-dehydro derivatives of the above mentioned compounds, such as 4,4-diphenyl-cyclohexen-(2)-one-oxime,
4,4-diphenyl-6-n-butyl-cyclohexen-(2)-one-oxime,
1-isopropylimino-4,4-diphenyl-cyclohexene-(2),
1-sec.-butylimino-4,4-diphenyl-cyclohexene-(2),
1-benzylidene-amino-4,4-diphenyl-cyclohexene-(2),
1-acetamido-4,4-diphenyl-cyclohexene-(2),
1-cyclohexylimino-4,4-diphenyl-cyclohexene-(2).

As enamines of Formula III, there are preferably employed: 1-dimethylamino-, 1-diethylamino-, 1-methylethylamino-, 1-methylisopropylamino-, 1-methyl-sec.-butylamino-, 1-pyrolidino-, 1-piperidino-4,4-diphenyl-cyclohexene-(1).

A compound of Formula II or III can be converted into a compound of Formula I, for example, by catalytic hydrogenation. Catalysts employed in this connection are noble metal catalysts, copper-chromium-oxide catalysts, as well as nickel and cobalt catalysts. The noble metal catalysts can be in the form of support catalysts (for example, palladium on charcoal), in the form of oxide catalysts (for example, platinum oxide), or in the form of finely divided metal catalysts (for example, platinum black). Nickel and cobalt catalysts are suitably used in the form of Raney metals, and nickel is also employed on kieselguhr or pumice as the supports.

Depending upon the constitution of the starting compounds, the hydrogenation is conducted at normal or elevated pressure (up to about 200 atmospheres) and at room temperature or increased temperature (up to about 200° C.). The hydrogenation is carried out in the presence of a solvent, preferably methanol, ethanol, isoproponal, tert.-butanol, ethyl acetate, dioxane, tetrahydrofuran, water, acetic acid, an aqueous mineral acid, or an alkali base, or mixtures of the above-mentioned solvents; in this connection, however, the constitution of the starting compounds must be considered. Thus, it is basically possible to operate in the acidic, neutral, or basic media. For such compounds of Formula II containing a C=N double bond, a reaction in the neutral or basic medium is preferred.

Also generally applicable as a reaction method is the reaction with nascent hydrogen. The latter can be produced, for example, by treatment of metals with acids or bases. Thus, it is possible, for example, to employ a mixture of zinc with acid or alkali base, of iron with hydrochloric acid or acetic acid, or of tin with hydrochloric acid. Additionally suitable is the use of sodium or another alkali metal in ethanol, isopropanol, or butanol (the amines of the Formula I with a double bond in the 2,3-position are particularly amenable to synthesis in this manner). Furthermore, it is possible to use an aluminumnickel alloy in an alkaline-aqueous solution, if desired with the addition of alcohol. Likewise suitable is sodium or aluminum amalgam in an aqueous-alcoholic or aqueous solution. The reaction can, if desired, be conducted in heterogeneous media; in this connection, it is advantageous to employ an aqueous phase and a benzene or toluene phase. The reaction temperatures employed range between the room temperature and the boiling point of the solvent used. The reaction is preferably terminated by boiling the reaction mixture.

Starting compounds of Formula II can also be converted into amines of Formula I by cathodic reduction. For this purpose, there is employed an aqueous-acidic reaction solution which optionally contains a further solvent, such as glacial acetic acid or alcohol; and the reduction step is conducted at a lead, copper, nickel, or carbon electrode.

The reducing agent can also be a complex metal hydride, such as, preferably, lithium aluminum hydride or sodium borohydride in the presence of aluminum chloride or lithium bromide. The starting materials not amenable to this method of reduction are Schiff bases (II, X==NR$^3$ or H, N=R')

as well as acyl amines. The reaction conditions are conventional; the reaction is suitably conducted in the presence of an inert solvent, for example, ether, tetrahydrofuran, or ethylene glycol dimethyl ether. The reaction is advantageously terminated by boiling the reaction mixture. The decomposition of the metal complexes formed can be carried out in a conventional manner, for example by means of an aqueous ammonium chloride solution.

Still further suitable reducing agents are, for example, sodium dithionite in an alkaline or ammoniacal solution, ferrous hydroxide, stannous, chloride; hydrogen sulfide, sulfur hydrides (hydrosulfides), sulfides, and polysulfides; and hydrazine.

Basically all conventional reduction methods known from the literature can be employed, it being obvious to chemists which specific method is most amenable to which specific starting material. It is possible that during the reduction, other groups which may be present in the molecule are likewise reduced. Thus, for example, double bonds in a 2,3-position can be simultaneously hydrogenated; and aromatically bound chlorine or bromine atoms can be split off hydrogenolytically. If such a simultaneous reduction of such double bonds or groups is not desired, there can be employed either chemical reducing agents, such as lithium aluminum hydride or nascent hydrogen, whose specific mode of effectiveness is known, or there are conducted partial catalytic hydrogenations under conditions well known from the literature.

It is furthermore possible to convert a compound of Formula IV into a compound of Formula I by treating the former with a base of Formula V or with agents which give off such a base under the reaction conditions. Preferably suitable as starting compounds IV for this embodiment of the invention are the following: 4,4-diphenyl-cyclohexanol, 4,4-diphenyl-cyclohexyl-chloride and -bromide, 4,4-diphenyl-cyclohexanone, as well as 4,4-diphenyl-cyclohexen-(2)-ol, 4,4-diphenyl-cyclohexen-(2)-yl-chloride and -bromide, and 4,4-diphenyl-cyclohexen-(2)-one.

Suitable bases of Formula V are mainly: ammonia, methyl-, ethyl-, propyl-, isopropyl-, butyl-, isobutyl-, sec.-butyl-, tert.-butyl-, amyl-, isoamyl-, hexyl-, isohexyl-, heptyl-, octyl-, allyl-, cyclopropyl-, cyclobutyl-, cyclopentyl-, cyclohexyl-, benzyl-, 2-phenylethyl-, 1-phenylethyl-, dimethyl-, methylethyl-, diethyl-, methylpropyl, methylisopropyl-, methyl-n-butyl-, methylisobutyl-, methyl-sec.-butyl-amine, pyrrolidine, 2-methyl-pyrrolidine, 2-ethylpyrrolidine, 4-methyl-piperidine, piperidine.

Salts of the bases V are preferably the carbonates, bi-carbonates, or carbaminates. The reaction can be conducted in the presence or absence of a solvent. Solvents which can be employed are, for example, lower aliphatic alcohols, such as methanol, ethanol, or isopropanol, or lower aliphatic ketones, such as acetone or butanone, or benzene, toluene, acetonitrile, or mixtures thereof. Of course, when selecting the solvent, the structure of the starting compounds must be considered; for example, for reacting the compounds IV (Y=H, OH or O), the use of alcohols or ketones as the solvent is less advantageous because of the possibility of side reactions. Depending upon the constitution of the starting compounds, various temperature ranges can be used for the reaction; for example, it is possible to operate at room temperature or at the boiling temperature of the solvent employed. It is also possible to conduct the reaction in an excess of the base V as the solvent. For a faster rate of reaction, it is possible to operate under superatmospheric pressure and/or at elevated temperatures, the base V being preferably employed in excess. This mode of operation is particularly recommended where alcohols of Formula IV (Y=H, OH)

are used as starting materials. In this reaction, hydrogenation catalysts are advantageously added, such as Raney nickel, platinum, or palladium; and the reaction mixture is heated in a pressurized vessel to preferably 130–220° C.

It is also possible to conduct the amination in the presence of a reducing agent. For example, 4,4-diphenyl-cyclohexanones or the 2,3-dehydro derivatives thereof can be hydrogenated in the presence of a base of Formula V, platinum or Raney nickel being preferably used as the catalysts, and the reaction being conducted under the conditions described in the literature.

Furthermore, the reaction of the ketones (IV, Y=0) to form the amines I is successfully accomplished with amines, and formic acid or the corresponding ammonium formiates or formamides, under the conditions of the Leuckart-Wallach reaction known from the literature.

Still further, compounds of Formula I can be produced by liberating hydrogenolytically, hydrolytically, alcoholytically, or aminolytically the hydroxy and/or the amino group or groups in a compound having the basic structure of Formula I containing one (or more) functionally altered hydroxyl group (or groups) on one or more of the phenyl residues and/or in one or both of the residues $R^2$ and $R^3$, and/or having its amino group present in a functionally altered form.

Functionally altered hydroxy groups are understood to include the following: acyloxy or other ester groups, such as chlorine or bromine, alkoxy, or benzyloxy groups. The functionally altered amino groups can be acylated, for example, or can be present as N-arylsulfonyl, N-benzal, N-benzyl, N-carbobenzoxy, or N-nitroso derivatives. In detail, the following starting compounds can be preferably employed: 4,4-bis-(p-acetoxyphenyl)-cyclohexylamine, 1-acetamido-, 1-benzenesulfonamido-, 1-benzyl-idene-amino-, 1-benzylamino-, 1-carbobenzoxyamino-, 1-nitroso-amino-, 1 - phthalimido-4,4-diphenyl-cyclohexane. The amino group can also be modified in the form of an isocyanate group; in this connection, the 4,4-diphenylcyclohexyl-isocyanates can also be produced as intermediates in a Hofmann, Curtius, Lossen, or Schmidt reaction of 4,4-diphenyl-cyclohexane-carboxylic acid amides.

A hydrogenolysis reaction is conducted with catalytically activated hydrogen under the above-mentioned conditions. The starting compounds can be likewise subjected to a hydrolysis process, whereby the hydroxy and/or amino group(s) is (are) liberated. The hydrolysis can be conducted in acidic or alkaline surroundings, suitably in an aqueous-alcoholic medium at boiling temperature. Suitable acids are preferably hydrochloric acid or sulfuric acid; suitable bases are particularly sodium or potassium hydroxide.

In order to accomplish a hydrolytic splitting of ether groups, rather severe reaction conditions should be employed. In this case, the reaction is preferably conducted with a concentrated aqueous hydrohalic acid solution, and at elevated temperatures. For this ether splitting reaction it is also possible to employ aluminum chloride or bromide, boric tribromide, diphenyl phosphine, in the presence of butyl lithium or sodium amide in liquid ammonia.

An acylated amino group of an amine of Formula I can also be liberated either alcoholytically, by treating such a compound with a lower aliphatic alcohol in the presence of hydrogen chloride; or aminolytically, by treating the starting compound in an autoclave with ammonia or an amine, for example, methyl or ethyl amine. The amine or ammonia employed serves simultaneously as the solvent in this reaction, and both compounds are used in large excess. Reaction temperatures up to about 250° C. are preferably employed in this connection. For splitting the acyl amines, it is also possible to use methods known from the literature.

It is furthermore possible to treat primary or secondary amines of Formula I ($R^3$=H), which may have been obtained, with alkylating agents. Such alkylating agents are preferably alkyl, alkenyl, cycloalkyl, or aralkyl esters of inorganic acids, such as for example, hydrohalic acids, sulfuric acid, phosphoric acid, or organic sulfonic acids, such as, for example, p-toluene-sulfonic acid. It is further possible to carry out a condensation reaction with aldehydes or ketones, with the formation of aldehyde-ammonias or Schiff bases, and to either hydrogenate these compounds as stated above, or to treat them with an alkylating agent and hydrolyze them.

The alkylation of the amino group can be accomplished, for example, by condensation with benzaldehyde to form a Schiff base, and treatment of the condensation product with alkyl halogenides, such as, for example, methyl chloride, methyl bromide, methyl iodide, ethyl bromide, isopropyl bromide, or with dimethyl sulfate. In this reaction, there is first obtained the quaternary salt of the Schiff base which is subsequently converted, for example by treating the same with aqueous ethanol or with acids, such as hydrochloric acid, into the secondary amine.

Likewise, the novel compounds of Formula I are obtained if an amine of the general Formula I ($R^3$=H) is reacted with an aldehyde in the presence of formic acid. Also, the reaction of an amine of the Formula I ($R^3$=H) with an alcohol in the presence of Raney nickel, as well as the acylation and subsequent reduction thereof, for example with lithium aluminum hydride, can be conducted with no difficulty.

Quite generally, all methods can be employed disclosed in the literature for the alkylation of primary and secondary amines, respectively.

The compounds of Formula I can be converted into physiologically compatible acid addition salts by treatment with acids. For this purpose, inorganic or organic, for example, aliphatic, alicyclic, araliphatic, aromatic, or heterocyclic, mono- or poly-basic carboxylic or sulfonic acids can be used. As preferred embodiments of such acids, the following are to be mentioned: mineral acids, such as hydrochloric acid, hydrobromic acid, hydriodic acid, sulfuric acid, nitric acid, or phosphoric acids, such as orthophosphoric acid, sulfamic acid, or organic acids, such as formic acid, acetic acid, propionic acid, butyric acid, pivalic acid, diethyl acetic acid, oxalic acid, malonic acid, succinic acid, pimelic acid, fumaric acid, maleic acid, citric acid, gluconic acid, lactic acid, tartaric acid, malic acid, benzoic acid, salicylic acid, phenyl-propionic acid, ascorbic acid, isonicotinic acid, methanesulfonic acid, ethane-disulfonic acid, β-hydroxyethanesulfonic acid, p-toluenesulfonic acid, naphthalene-mono- or disulfonic acids.

By treatment with alkylating agents, such as methyl iodide, dimethyl sulfate, ethyl chloride, bromide, or iodide, propyl chloride, bromide or iodide, n-butyl chloride, bromide, or iodide, amines of Formula I can furthermore be converted into the physiologically compatible quaternary ammonium salts thereof. Preferably the alkyl portion of the alkylating agent contains up to 7 carbon atoms.

The free bases of Formula I can, if desired, be obtained from their salts by treatment with strong bases, such as sodium or potassium hydroxide, or sodium or potassium carbonate.

Those compounds of Formula I wherein $R^1$ is not H, possess two asymmetrical carbon atoms. Therefore, they are obtained, when being synthesized, in two racemic forms (cis- and trans-configuration). Depending upon the manufacturing process employed, one or the other of these configurations is predominant. In many cases, it is preferred, as a practical matter, to isolate only the configuration which is predominant. In other cases wherein both configurations are obtained, the separation thereof can be conducted in the conventional manner, for example, by distillation, crystallization of the free bases or suitable salts, chromatography, or by employing these separating methods in combination. Each of these racemates can be split conventionally into its optically active components by treatment with optically active acids, for example tartaric acid, camphor-sulfonic acid, mandelic (phenylhydroxyacetic) acid, malic acid, lactic acid. Such a splitting step can be conducted quite generally in accordance with the methods disclosed in the literature. Optically active forms of the compounds of Formula I can, of course, also be obtained when reacting optically active starting substances in the manner according to the invention.

Preferred compounds of this invention are compounds of Formula VI, and the 2,3-dehydro derivatives, acid addition salts, and quaternary ammonium salts of these compounds

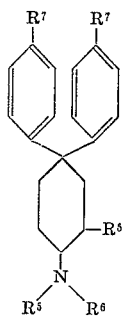

VI wherein:

$R^4$ represents H or alkyl of 1–4 carbon atoms,
$R^5$ is H, or alkyl of 1–4 carbon atoms,
$R^6$ is H, alkyl of 1–8 carbon atoms, or cyclohexyl, and
$R^7$ is H or $CH_3O$.

Particularly valuable are compounds of Formula VII:

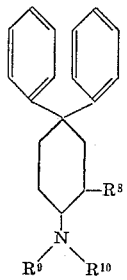

VII wherein:

$R^8$ is H or $CH_3$,
$R^9$ is H or $CH_3$, and
$R^{10}$ is H or alkyl of 1–5 carbon atoms as well as the acid addition salts thereof.

Some of the starting compounds of Formula II to V are known, and those which are not known can be produced according to the methods generally described in the literature, as follows:

The condensation of diphenyl acetaldehydes with methylvinyl ketone leads to 4,4-diphenyl-cyclohexen-(2)-ones.

The latter can be reduced to the corresponding cyclohexanones (IV, Y=O) or cyclohexanols (IV, Y=H, OH), preferably by catalytic hydrogenation. From the cyclohexanones, the following compounds can be produced: with hydroxylamines, the oximes (II, X=NOH); with amines, the Schiff bases (II, X=NR³) or the enamines of the Formula III; with hydrazines, the corresponding hydrazones and azines. The cyclohexanols can be converted into the ethers (IV, Y=H, lower alkoxy) by etherification; and into the cyclohexyl-halogenides (IV, Y=H, Hal)

by reaction with hydrogen chloride or bromide, phosphorus tribromide, thionyl chloride, or other inorganic acid halogenides. From the cyclohexyl halogenides, there can be produced: with silver nitrite, the nitro compounds (II, X=H, $NO_2$); with potassium phthalimide, the 1-phthalimido-4,4-diphenyl-cyclohexanes. Analogously, the 2,3-dehydro derivatives of these compounds can be obtained; the cyclohexen-(2)-ols (IV, Y=H, OH; double bond in the 2,3-position) can be obtained from the cyclohexen-(2)-ones with lithium aluminum hydride.

It is also possible to produce these starting compounds only in situ. Thus, by heating ketones (IV, Y=O) with primary amines in the autoclave to preferably 150–250° C., the Schiff bases (II, X=NR³) can be produced which are subsequently hydrogenated in the same vessel, after the addition of a catalyst, to obtain the amines I.

Ketones of Formula IV (Y=O) wherein $R^1$ is not H can be produced by the alkylation of enamines of Formula III ($R^1$=H, $R^2$ and $R^3$ not=H). Furthermore, they can be obtained by reacting the ketones IV (Y=O, $R^1$=H)

with the primary amines, for example with cyclohexylamine, to form Schiff bases, and reacting these Schiff bases with a Grignard compound, for example ethyl magnesium bromide. In this process, there are obtained, with the splitting off of hydrocarbon (for example ethane), N-metallized enamines turning into the Schiff bases which are alkylated in the 2-position by alkylating agents (for example, alkyl halogenides or sulfates); these Schiff bases are hydrolyzed with acid to the desired ketones IV (Y=O, $R^1$ is not=H).

Novel intermediates of the invention are:

4,4-diphenyl-cyclohexen-(2)-one-oxime
4,4-bis-(p-methoxyphenyl)-cyclohexen-(2)-one-oxime
4,4-bis-(p-tolyl)-cyclohexen-(2)-one-oxime
4,4-bis-(p-isopropylphenyl)-cyclohexen-(2)-one-oxime
4,4-diphenylcyclohexanone-oxime
1-acetamido-4,4-diphenyl-cyclohexane
1-propionamido-4,4-diphenyl-cyclohexane
1-butyramido-4,4-diphenyl-cyclohexane
1-capronamido-4,4-diphenyl-cyclohexane
1-caprylamido-4,4-diphenyl-cyclohexane
1-ethylideneamino-4,4-diphenyl-cyclohexane
1-propylideneamino-4,4-diphenyl-cyclohexane
1-isopropylideneamino-4,4-diphenyl-cyclohexane
1-butylideneamino-4,4-diphenyl-cyclohexane
1-isobutylideneamino-4,4-diphenyl-cyclohexane
1-sec.-butylideneamino-4,4-diphenyl-cyclohexane
1-ethylimino-4,4-diphenyl-cyclohexene-(2)
1-propylimino-4,4-diphenyl-cyclohexene-(2)
1-isopropylimino-4,4-diphenyl-cyclohexene-(2)
1-butylimino-4,4-diphenyl-cyclohexene-(2)
1-isobutylimino-4,4-diphenyl-cyclohexene-(2)
1-sec.-butylimino-4,4-diphenyl-cyclohexene-(2)
1-ethylimino-4,4-diphenyl-cyclohexane
1-propylimino-4,4-diphenyl-cyclohexane
1-isopropylimino-4,4-diphenyl-cyclohexane
1-butylimino-4,4-diphenyl-cyclohexane
1-isobutylimino-4,4-diphenyl-cyclohexane
1-sec.-butylimino-4,4-diphenyl-cyclohexane The novel products of the invention can be compounded with conventional pharmaceutical excipients. For example, there can be employed as carrier substances such organic or inorganic compounds which are suitable for parenteral or enteral application (and of course which do not react with the novel compounds), such as, for example, water, vegetable oils, polyethylene glycols, gelatin, lactic sugar, amylose, magnesium stearate, talc, vaseline, cholesterol, etc. For parenteral application, particularly preferred are solutions, preferably oily or aqueous solutions, as well as suspensions, emulsions, or implants. For enteral application, there can furthermore be employed tablets (i.e., pills, dragees, capsules, etc.), if desired sterilized or mixed with auxiliary agents, such as preservatives, stabilizers, or wetting agents, or salts for influencing the osmotic pressure, or with buffer substances.

The novel compounds are preferably administered to mammals in dosages between 1 and 100 mg. per dosage unit. Ampoules are considered to be a dosage unit for parenteral application. With respect to enteral application, tablets are considered unit dosages, said tablets usually being formulated with at least one carbohydrate. If a liquid is used for enteral application, a sweetened vehicle is customarily employed.

The compounds have been tested in vitro on isolated organs such as intestines, gall bladders or ureters of rats, guinea pigs or hogs. Additionally, they have been tested in vivo orally, subcutaneously, intravenously and intraperitoneally on mice, rats, rabbits, cats, guinea pigs, and dogs. For clinical studies, the compounds are applied to humans orally, subcutaneously, intravenously or rectally.

It is to be appreciated that the foregoing description of the reactions which are utilized to produce the novel compounds of this invention is adequate to teach a chemist skilled in the art how to produce the novel compounds of this invention. The following examples, therefore, are merely preferred specific embodiments of this invention, and are not intended to be limitative of the specification and appended claims.

EXAMPLE 1

2 g. potassium hydroxide and 7.5 g. 4,4-diphenyl-cyclohexen-(2)-one-oxime (M.P. 142° C.) are dissolved in 200 ml. methanol. After the addition of 2 g. Raney nickel, the oxime is hydrogenated at 50° C. and 6 atmospheres. After the absorption of an amount of hydrogen corresponding to 3 mols, the catalyst is filtered off, and the reaction mixture is made acidic with dilute hydrochloric acid, concentrated, and the residue is recrystallized from ethanol. There is obtained 4,4-diphenyl-cyclohexylamine-hydrochloride, M.P. 260° C.

The starting material is obtained as follows:

12.4 g. 4,4-diphenyl-cyclohexen-(2)-one and 5 g. potassium hydroxide are dissolved in 50 ml. ethanol. There are added 5 g. hydroxylamine hydrochloride; the reaction solution is boiled for 6 hours, vacuum-filtered, and concentrated by evaporation. The residue is taken up in water and extracted with ether. The ether solution is dried with magnesium sulfate, concentrated, and the remaining oxime is recrystallized from ethanol.

Analogously, there are obtainable:

From 4,4 - bis-(p-methoxyphenyl)-cyclohexen-(2)-one-oxime (produced by reacting bis-(p-methoxyphenyl)-acetaldehyde with methylvinyl ketone according to the method disclosed in "Journal of the American Chemical Society," vol. 84, p. 4534 (1962) and subsequent oximation) 4,4-bis-(p-methoxyphenyl)-cyclohexylamine (B.P. 176–178° C./0.03 mm.;

From 4,4 - bis-p-tolyl-cyclohexen-(2)-one-oxime (M.P. 140° C.; produced from bis-p-tolyl-acetaldehyde and methylvinyl ketone by way of 4,4-bis-p-tolyl-cyclohexen-(2)-one, B.P. 173–175° C./0.05 mm.) 4,4-bis-p-tolyl-cyclohexylamine, hydrochloride, M.P. 240° C.;

From 4,4 - bis-p-isopropylphenyl-cyclohexen-(2)-one-oxime (produced from bis-p-isopropylphenyl-acetaldehyde (M.P. 55° C.) and methylvinyl ketone by way of 4,4-bis-p - isopropylphenyl-cyclohexen-(2)-one, B.P. 210–215° C./0.05 mm.) 4,4-bis-p-isopropylphenyl-cyclohexylamine, hydrochloride, M.P. 240° C.

EXAMPLE 2

43.3 g. 4,4-diphenyl-cyclohexanone-oxime (M.P. 160° C.) are dissolved in 500 ml. methanol and, after the addition of 11.5 g. potassium hydroxide and 10 g. Raney nickel, the oxime is hydrogenated at 10 atmospheres and 50–60° C. for 6 hours. The reaction mixture is vacuum-filtered from the catalyst, the methanol is distilled off, and the residue is taken up in dilute hydrochloric acid. The acidic solution is washed with ether, made alkaline with sodium hydroxide solution, and extracted with chloroform. The chloroform solution is dried over magnesium sulfate, filtered, and concentrated. The remaining 4,4-diphenyl-cyclohexylamine boils at 160–165° C./0.05 mm. and melts at 100° C.

The starting material is obtained as follows:

49 g. 4,4-diphenyl-cyclohexen-(2)-one are dissolved in 500 ml. methanol and agitated, after the addition of 5 g. 5% palladium-charcoal catalyst, at room temperature and normal pressure under a hydrogen atmosphere. After the stoichiometric quantity of hydrogen has been absorbed, the hydrogenation is terminated, and the catalyst is filtered from the hot reaction solution. After the methanol is distilled off up to the extent of about 100 ml. the reaction mixture is cooled and subsequently vacuum-filtered. There are obtained 48 g. 4,4-diphenyl-cyclohexanone, M.P. 100° C., which is then mixed with 100 ml. ethanol, 100 ml. pyridine, and 36 g. hydroxyl amine-hydrochloride, and boiled for 5 hours. Thereafter, the mixture is concentrated under vacuum; the residue is taken up in chloroform, and the chloroform solution is washed with water, dried over magnesium sulfate, filtered, and concentrated. The remaining oxime is recrystallized from ethanol.

EXAMPLE 3

3 g. 4,4-diphenyl-cyclohexylamine-hydrochloride, 5 ml. formic acid, 0.7 g. sodium formiate, and 4 ml. formaldehyde solution of 40 vol. percent are mixed and heated for 3 hours at 60° C., and then heated for 12 hours at 100° C. Thereafter, the mixture is mixed with water, made alkaline with sodium hydroxide solution, and extracted with ether. After the ether is dried, the 1-dimethylamino-4,4-diphenyl-cyclohexane-hydrochloride is precipitated with ethereal hydrochloric acid and recrystallized from ethanol; M.P. 248° C.

Analogously, there is obtainable 1-dimethylamino-4,4-bis-p-tolyl-cyclohexane-hydrochloride, M.P. 232° C.

EXAMPLE 4

A solution of 5 g. 4,4-diphenyl-cyclohexylamine in 50 ml. benzene is boiled for about 2 hours on a water separator with 3 g. benzaldehyde. The thus-obtained benzenic solution of the Schiff base is agitated in a tubular bomb together with 10 g. methyl iodide, for 12 hours at 150° C., and thereafter the benzene and the excess methyl iodide are distilled off. The residue is boiled for 10 minutes in 90% ethanol, the alcohol is distilled off, the reaction mixture is taken up in dilute hydrochloric acid, and the split-off benzaldehyde is extracted with ether. The acidic-aqueous solution is made alkaline with solution of sodium hydroxide, and extracted with chloroform. After the chloroform solution has been dried and concentrated, the remaining 1-methylamino-4,4-diphenyl-cyclohexane is distilled at 151–152° C./0.04 mm.; hydrochloride, M.P. 266–268° C.

EXAMPLE 5

5 g. 4,4-diphenyl-cyclohexylamine are dissolved, together with 2.2 g. triethylamine, in 50 ml. absolute benzene. 1.6 g. acetyl chloride in 20 ml. absolute benzene are added dropwise to the solution under stirring. The stirring is continued for 2 hours at room temperature, and the solution is then shaken out with dilute hydrochloric acid. The benzenic solution is dried and concentrated. The residue is dissolved in 50 ml. absolute tetrahydrofuran, and the solution is added dropwise, under stirring, to 1 g. lithium aluminum hydride in 50 ml. absolute tetrahydrofuran. The reaction solution is then boiled for 2 hours; then, dilute hydrochloric acid is slowly added under cooling and stirring, and the tetrahydrofuran is distilled off. The remaining acidic-aqueous solution is washed with ether, made alkaline with a solution of sodium hydroxide, and extracted with chloroform. The chloroform extract is dried and concentrated, and the remaining 1-ethyl-amino-4,4-diphenyl-cyclohexane is distilled at 160–162° C./0.05 mm. The hydrochloride melts at 237–238° C.

Analogously, there are obtainable:

1 - propylamino-4,4-diphenyl-cyclohexane, B.P. 162–164°/0.05 mm.; hydrochloride, M.P. 210°;

1 - n - butylamino-4,4-diphenyl-cyclohexane, B.P. 168–170°/0.05 mm.; hydrochloride-hemihydrate, M.P. 110°;

1 - n - hexylamino-4,4-diphenyl-cyclohexane, B.P. 178–179°/0.05 mm.; hydrochloride, M.P. 120°;

1 - n - octylamino-4,4-diphenyl-cyclohexane, B.P. 190–193°/0.05 mm.; hydrochloride, M.P. 128–130°.

EXAMPLE 6

5 g. 4,4-diphenyl-cyclohexylamine are boiled, together with 7 g. isobutyraldehyde, in 100 ml. benzene for 5 hours, water being separated. Thereafter, the benzene is distilled off. The remaining Schiff base is hydrogenated in 150 ml. methanol after the addition of 0.5 g. platinum oxide at room temperature and normal pressure. After a quantity of hydrogen corresponding to one mol has been absorbed, the mixture is filtered off from the catalyst, made acidic with dilute hydrochloric acid, and the methanol is removed under vacuum. The remaining aqueous solution is made alkaline with solution of sodium hydroxide and extracted with ether. After drying and concentrating the ether extract, the 1-isobutylamino-4,4-diphenyl-cyclohexane is distilled at 171–175° C./0.03 mm. The hydrochloride melts at 208–209° C.

EXAMPLE 7

20 g. 4,4-diphenyl-cyclohexen-(2)-one, 10 g. isopropylamine, and 50 ml. tetrahydrofuran are agitated for 10 hours in a bomb tube at 200° C. Subsequently, the reaction mixture is cooled, and the tetrahydrofuran and the excess isopropylamine are distilled off. The remaining Schiff base is dissolved in methanol and after the addition of 2 g. platinum oxide, the base is hydrogenated at normal pressure and room temperature until a quantity of hydrogen corresponding to 2 mols has been absorbed. The mixture is worked up as in Example 6. There are obtained 17 g. 1-isopropylamino-4,4-diphenyl-cyclohexane, B.P. 164–165° C./0.05 mm. The hydrochloride melts at 230° C.

Analogously, there are obtainable:

1 - sec.-butylamino-4,4-diphenyl-cyclohexane, B.P. 166–167° C./0.05 mm.; hydrochloride, M.P. 170° C.

1 - cyclohexylamino-4,4-diphenyl-cyclohexane, hydrochloride, M.P. 264–265° C. (the production of the Schiff base is accomplished by boiling the components in toluene on a water separator);

1 - isopropylamino-4,4-bis-p-tolyl-cyclohexane, hydrochloride, M.P. 261° C.

1 - isopropylamino-4,4-bis-(p-isopropylphenyl)-cyclohexane, hydrochloride, M.P. 180°;

1 - (2 - p - tolylethylamino)-4,4-diphenyl-cyclohexane, methanesulfonate, M.P. 282°;

1 - [2-(3-hydroxy-4-methoxyphenyl)-ethylamino]-4,4-diphenylcyclohexane, ethanesulfonate, M.P. 255°;

1 - [2-(3,4-methylenedioxyphenyl)-propylamino]-4,4-diphenylcyclohexane; hydrochloride, M.P. 214°;

1 - (2-phenylbutylamino)-4,4-diphenylcyclohexane, hydrochloride, M.P. 171°;

1 - isopropylamino-2-methyl-4,4-bis-p-tolyl-cyclohexane (mixture of isomers; separation of the free bases on aluminum oxide and conversion into the hydrochlorides yields two isomers having the melting points of 242–243° C. and 255–256° C., respectively).

EXAMPLE 8

10 g. 4,4-diphenyl-cyclohexanol (M.P. 138° C.) are dissolved in 40 ml. isopropylamine, and after adding 2 g. Raney nickel the solution is agitated in a tubular bomb, for 15 hours at 160° C. After the catalyst has been filtered off, the excess isopropylamine is distilled off, the mixture is worked up as in Example 6, and there is obtained 1-isopropylamino-4,4-diphenyl-cyclohexane, B.P. 165–175° C./0.05 mm., hydrochloride, M.P. 230° C.

The starting material is obtained by hydrogenation of 4,4-diphenyl-cyclohexen-(2)-one on platinum oxide in methanol until an amount of hydrogen has been absorbed corresponding to 2 mols.

EXAMPLE 9

84 g. 4,4-diphenyl-cyclohexen-(2)-one and 35 g. isopropylamine are heated in 700 ml. methanol in an autoclave for 5 hours to 200° C. Thereafter, the mixture is allowed to cool. After the autoclave is opened, there are added 20 g. Raney nickel moistened with methanol, and the mixture is hydrogenated at 100 atmospheres and 79° C. After about one hour, a quantity of hydrogen corresponding to 2 mols is absorbed. A working-up step as in Example 6 is conducted, and there is obtained 1-isopropylamino-4,4-diphenylcyclohexane-hydrochloride, M.P. 230° C. (from ethanol). As a by-product, a small amount of 4,4-diphenyl-cyclohexanol is obtained.

EXAMPLE 10

7 g. 1 - isopropylamino-4,4-diphenyl-cyclohexane are dissolved in 40 ml. formic acid. There are added 6 g. formaldehyde solution of 40 vol.-percent, and the mixture is heated for 3 hours to 60° C. and 12 hours to 100° C. Subsequently, the mixture is concentrated under vacuum, taken up in water, made alkaline with solution of sodium hydroxide, and shaken out with ether. After the ether solution has been dried and concentrated, there is obtained 1-(N-methyl-N-isopropylamino)-4,4-diphenyl-cyclohexane, B.P. 164–165° C./0.05 mm.; hydrochloride, M.P. 214–215° C. (from ethanol).

Analogously, there are obtainable:

1 - (N - methyl - N - sec. - butylamino) - 4,4 - diphenyl-cyclohexane, B.P. 165–167° C./0.05 mm.; hydrochloride, M.P. 188–190° C.; methobromide, by heating the free base for 12 hours with methyl bromide in benzene to 100° C. in a tubular bomb, M.P. 208–210° C. (from ethanol);

1 - (N - methyl - N - cyclohexylamino) - 4,4 - diphenyl-cyclohexane, hydrochloride, M.P. 234–235° C. (from ethanol/ether); methobromide, M.P. 215–216° C. (from ethanol);

1 - (N - methyl - N - isopropylamino) - 4,4 - bis - p-tolyl-cyclohexane, hydrochloride, M.P. 245° C.

1 - (N - methyl - N - isopropylamino) - 4,4 - bis - (p-isopropylphenyl) - cyclohexane, hydrochloride, M.P. 260° C.

EXAMPLE 11

2.5 g. 1 - (N - methyl-N-isopropylamino)-4,4-diphenyl-cyclohexane are dissolved in 50 ml. benzene, and 9 g. methyl iodide are added to the solution. After boiling for three hours, there are obtained 3 g. quaternary iodide. The salt is suspended in 150 ml. water. Silver chloride which has been freshly produced from 17 g. silver nitrate is added, and the mixture is heated for 1 hour on the steam bath. Thereafter, the mixture is vacuum-filtered, the water is distilled off under vacuum, and the residue is recrystallized from ethanol-ether. There is obtained N-(4,4 - diphenyl - cyclohexyl) - N,N - dimethyl - N - isopropyl-ammonium chloride, M.P. 245° C. (decomposition).

EXAMPLE 12

8.5 g. 4,4-diphenyl-6-methyl-cyclohexen-(2)-one-oxime (M.P. 144–145° C.) are dissolved in 150 ml. methanol, and after the addition of 1 g. potassium hydroxide and 2 g. Raney nickel, hydrogenated at 6 atmospheres and 60° C., until a quantity of hydrogen corresponding to 3 mols has been absorbed. After 2 hours, the mixture is vacuum-filtered; the filtrate is acidified with dilute hydrochloric acid, and the methanol is distilled off. Subsequently, the hyrochloric solution is washed with ether, made alkaline with solution of sodium hydroxide, and the base is extracted with ether. After drying and concentrating the ether solution, there remain 7.5 g. of the base which is gently dissolved in the warm state in 10 ml. 5 N-hydrochloric acid. After cooling and then standing for several hours, there are obtained 3.1 g. hydrochloride of one of the stereoisomers ("α-isomer") of 2-methyl-4,4-diphenyl-cyclohexylamine, M.P. 255–256° C. (from ethanol).

The mother liquor of the hydrochloride is mixed with solution of sodium hydroxide and extracted with ether. The base is chromatographed on a silica gel column with 98% benzene and 2% triethylamine as the solvents. There are first obtained still 0.9 g. of the above-described α-isomer. As the second fraction, the β-isomer is obtained, dissolved in ether, and precipitated as the hydrochloride with ethereal hyrochloric acid; M.P. 214–215° C. (from ethanol); yield: 3.5 g.

The starting material is obtained as follows:

24 g. 1-cyclohexylimino-4,4-diphenyl-cyclohexene-(2) (obtained by boiling 4,4 - diphenyl-cyclohexen-(2)-one and cyclohexylamine in toluene) are dissolved in 100 ml. absolute tetrahydrofuran, and this solution is added to an ethyl magnesium bromide solution prepared from 3 g. magnesium and 13.5 g. ethyl bromide in 100 ml. absolute tetrahydrofuran. The mixture is boiled for 18 hours, subsequently mixed with 25 g. methyl iodide, and again boiled for 18 hours. Thereafter, the reaction mixture is cooled, and 150 ml. 10% hydrochloric acid is added dropwise; then, the mixture is boiled for an additional period of 2 hours, and the tetrahydrofuran is distilled off. The remaining acidic-aqueous phase is extracted with ether. From the ethereal solution, there are obtained, after drying and concentrating, 13 g. 4,4-diphenyl-6-methyl-cyclohexene-(2)-one, M.P. 94° C. (from ethanol); B.P. 162–165° C./0.05 mm.

10 g. 4,4 - diphenyl - 6 - methyl-cyclohexen-(2)-one are boiled, together with 8.5 g. hydroxylamine-hydrochloride and 60 ml. pyridine in 200 ml. ethanol for 5 hours. Thereafter, the solvents are distilled off, and the residue is taken up in water and ether. From the dried ether solution, there are obtained, after concentrating, 8.5 g. oxime.

Analogously, there is obtained, from 4,4-bis-p-tolyl-6-methyl-cyclohexen-(2)-one-oxime (produced by reacting 4,4-bis-p-tolyl-cyclohexen-(2)-one with cyclohexylamine, subsequent reactions with ethyl magnesium bromide and methyl iodide, and hydrolysis, to form 4,4-bis-p-tolyl-6-methyl-cyclohexen-(2)-one, B.P. 185–186° C./0.05 mm., and subsequent oximation): 2 - methyl-4,4-bis-p-tolyl-cyclohexylamine (mixture of isomers); hydrochloride, M.P. 85° C. (mixture of isomers).

EXAMPLE 13

31 g. 4,4-diphenyl-6-methyl-cyclohexen-(2)-one are hydrogenated in 400 ml. methanol in the presence of 5 g. 5% palladium-charcoal catalyst, at normal pressure and room temperature. After the absorption of a quantity of hydrogen corresponding to 1 mol, the reaction mixture is vacuum filtered from the catalyst in the hot state. After the methanol has been distilled off, there are obtained 30 g. 2-methyl-4,4-diphenyl-cyclohexanone, M.P. 99–100° C., which is converted according to the method described in Example 12, into the oxime (26.5 g., M.P. 154–155° C.) and further as in Example 12 into the stereoismeric 2 - methyl - 4,4 - diphenyl-cyclohexylamine-hydrochloride (α-isomed 11.5 g.; β-isomer 9.8 g.).

The starting product is obtainable as follows:

20 g. 4,4-diphenyl-cyclohexanone and 20 g. cyclohexylamine are boiled in 100 ml. toluene on a water separator until water ceases to be liberated. Thereafter, the toluene and excess cyclohexylamine are removed under vacuum, and the thus-obtained Schiff base is methylated in accordance with the method described in Example 12.

EXAMPLE 14

3 g. 2-methyl-4,4-diphenyl-cyclohexylamine-hydrochloride (α-isomer) are dissolved in 50 ml. formic acid. After the addition of 0.7 g. sodium formate and 3 ml. formaldehyde solution of 40 vol. percent, the reaction mixture is heated for 1 hour at 60° C. and subsequently for 5 hours at 100° C. Then, a working-up step is conducted as in Example 3, and there is obtained 1-dimethylamino-2-methyl-4,4-diphenyl-cyclohexane-hydrochloride (α-isomer), m.p. 230–231° C.

Analogously, there are obtained:

From the β-isomer of 2-methyl-4,4-diphenyl-cyclohexyl-amine - hydrochloride; 1 - dimethylamino-2-methyl-4,4-diphenyl-cyclohexane-hydrochloride (β-isomer) M.P. 260° C.;

From 2 - methyl-4,4-bis-p-tolyl-cyclohexylamine (mixture of isomers) 1-dimethylamino - 2- methyl - 4,4 - bis-p-tolyl-cyclohexane-hydrochloride, M.P. 233–235° C. (mixture of isomers).

EXAMPLE 15

9.5 g. 2-methyl-4,4-diphenyl-cyclohexanone, 15 g. isopropylamine, and 50 ml. toluene are agitated for 10 hours at 180° C. in a tubular bomb. Thereafter, the toluene and excess isopropylamine are distilled off. The Schiff base is dissolved in 200 ml. methanol, and after the addition of 0.5 g. platinum oxide, the reaction mixture is hydrogenated at room temperature and normal pressure. The working-up operation is conducted as in Example 6, but the crude base is converted into the hydrochloride without conducting a distilling step. There is obtained 1-isopropylamino-2-methyl-4,4-diphenyl-cyclohexane - hydrochloride, M.P. 198–200° C., which was found to be uniform by thin layer chromatography.

EXAMPLE 16

Analogously to Example 12, there are obtained, from 12 g. 4,4 - diphenyl - 6 - ethyl-cyclohexen,(2)-one-oxime (M.P. 168–170° C.; obtained by reacting 1-cyclohexylimino-4,4-diphenyl-cyclohexene-(2) with ethyl magnesium bromide, as well as ethyl iodide, and oximation of the thus - produced 4,4 - diphenyl-6-ethylcyclohexen-(2-one (B.P. 165–170° C./0.05 mm.) analogously to Example 12), 9.5 g. 2-ethyl-4,4-diphenyl-cyclohexylamine (mixture of α- and β-isomers) having the boiling point 164–166° C./0.03 mm. The hydrochloride (consisting of about equal parts of the two isomers) melts at 245° C. If the hydrochloride mixture is recrystallized from 60 ml. water, there are obtained 4 g. hydrochloride of the α-isomer, M.P. 275° C. By chromatography of the mother liquor residue on silica gel with benzene-triethylamine (95.5), 3 g. of the β-base can be obtained; picrate, M.P. 216–218° C. (decomposition).

Analogously, there can be produced:

4,4 - diphenyl - 6 - isopropyl-cyclohexen-(2)-one (B.P. 165–170° C./0.05 mm.) and therefrom, by way of the oxime, 2-isopropyl-4,4-diphenyl-cyclohexylamine; hydrochloride, M.P. 300° C. (sterically uniform);

4,4-diphenyl-6-propyl-cyclohexen-(2)-one (B.P. 180–185° C./0.05 mm.) and therefrom 2-propyl-4,4-diphenyl-cyclohexylamine; hydrochloride; M.P. 264–265° C. (sterically uniform);

4,4-diphenyl-6-n-butyl-cyclohexen-(2)-one (B.P. 185–188° C./0.05 mm.) and therefrom 2-n-butyl-4,4-diphenyl-cyclohexylamine; hydrochloride, M.P. 217–218° C. (sterically uniform).

EXAMPLE 17

4 g. 2-ethyl-4,4-diphenyl-cyclohexylamine-hydrochloride (α-isomer) are methylated according to the method described in Example 14. There is obtained 1-dimethylamino-2-ethyl-4,4-diphenyl-cyclohexane-hydrochloride (α-isomer), M.P. 244–245° C.

Analogously, there can be produced from the corresponding cyclohexylamines:

1-dimethylamino-2-ethyl-4,4-diphenyl-cyclohexane (β-isomer), hydrochloride, M.P. 235° C.;
1 - dimethylamino - 2 - n-propyl-4,4-diphenyl-cyclohexane-hydrochloride, M.P. 243° C.;
1 - dimethylamino - 2 - n-butyl-4,4-diphenyl-cyclohexane-hydrochloride, M.P. 230° C.

EXAMPLE 18

18.3 g. 1-isopropylimino-4,4-diphenyl-cyclohexene-(2) (B.P. 156–158° C./0.05 mm. obtained as in Example 7) are dissolved in 100 ml. absolute ether, and the solution is added dropwise to 4 g. lithium aluminum hydride in 50 ml. absolute ether. Thereafter, the mixture is boiled for 5 hours and mixed with water. After adding a solution of sodium hydroxide, the mixture is extracted with ether, and the ether solution is dried with magnesium sulfate. By the addition of ethereal hydrochloric acid, there is obtained 1-isopropylamino-4,4-diphenyl-cyclohexene - (2) - hydrochloride, M.P. 258–259° C.

Analogously, there are obtainable by converting the corresponding amines to Schiff bases thereof and subsequent reduction with lithium aluminum hydride:

1 - allylamino - 4,4 - diphenyl-cyclohexene-(2)-hydrochloride, M.P. 213° C.;
1-[2-(3,4-dichlorophenyl)-ethylamino] - 4,4 - diphenyl-cyclohexene-(2)-hydrochloride, M.P. 200° C.;
1 - isopropylamino - 4,4 - bis - p - chlorophenyl - cyclohexene-(2)-hydrochloride, M.P. 195° C. (from bis-p-chlorophenyl-acetaldehyde, M.P. 164° C., by way of 4,4-bis-p-chlorophenyl-cyclohexen-(2)-one, B.P. 193–196° C./0.05 mm.);

Further obtainable are the hydrochlorides of the following 4,4-diphenyl-cyclohexenes-(2):

1-methylamino-
1-ethylamino-
1-n-butylamino-
1-isobutylamino-
1-sec.-butylamino
1-dimethylamino-
1-(N-methyl-N-ethylamino)-
1-(N-methyl-N-n-propylamino)-
1-(N-methyl-N-isobutylamino)-
1-(N-methyl-N-sec.-butylamino)-
1-amino-6-methyl-
1-methylamino-6-methyl-
1-isopropylamino-6-methyl-
1-sec.-butylamino-6-methyl-
1-dimethylamino-6-methyl-
1-(N-methyl-N-isopropylamino)-6-methyl-
1-(N-methyl-N-sec.-butylamino)-6-methylas well as the hydrochlorides of the following 4,4-diphenyl-cyclohexanes:

1-allylamino-
1-[buten-(1)-yl-(3)-amino]-
1-[buten-(2)-yl-(1)-amino]-
1-[buten-(3)-yl-(1)-amino]-
1-propargylamino-
1-benzylamino-
1-[1-phenylethylamino]-

EXAMPLE 19

3.5 g. 1-isopropylamino-4,4-diphenyl-cyclohexene-(2)-hydrochloride, 20 ml. formic acid, 1.3 g. sodium formiate, and 5 ml. formaldehyde solution of 40 vol.-percent are reacted as described in Example 14, and worked up. There is obtained 1-(N-methyl-N-isopropylamino)-4,4-diphenyl-cyclohexene-(2)-hydrochloride, M.P. 244–245° C. (from ethanol).

EXAMPLE 20

(a) 36 g. 4,4-diphenyl-cyclohexanone, 150 ml. toluene, and 40 ml. pyrrolidine are boiled for 6 hours. Subsequently, the water which has formed is removed azeotropically. Again 40 ml. pyrrolidine is added; the mixture is boiled for another 12 hours, distilled, and the residue is dissolved in 200 ml. acetonitrile. After the dropwise addition of 24 g. allyl bromide, the mixture is boiled again for 15 hours, and then distilled. The thus-obtained 1-pyrrolidino-2-allyl-4,4-diphenyl-cyclohexene is taken up in 200 ml. absolute tetrahydrofuran, and under stirring there are slowly added 7.6 g. lithium aluminum hydride in 200 ml. tetrahydrofuran. After boiling for 6 hours, the reaction mixture is made acidic with dilute hydrochloric acid; the tetrahydrofuran is distilled off; and the hydrochloric aqueous solution is washed with ether. Then, the solution is made alkaline with a solution of sodium hydroxide, extracted with ether, dried over sodium sulfate, and ethereal hydrochloric acid is added. There is thus obtained 1 - pyrrolidino - 2 - allyl-4,4-diphenyl-cyclohexane-hydrochloride, M.P. 234–235° C. (from ethanol).

(b) Analogously, there is obtained, by reacting 2-allyl-4,4-diphenyl-cyclohexanone (B.P. 171–172° C./0.05 mm.) with isopropylamine in toluene, subsequent dropwise addition of an ethereal solution of the thus-obtained product to lithium aluminum hydride in absolute ether, and boiling overnight, 1-isopropylamino-2-allyl-4,4-diphenyl-cyclohexane-hydrochloride, M.P. 238° C. (one isomer).

EXAMPLE 21

58.5 g. 1-isopropylamino-4,4-diphenyl-cyclohexane and 30 g. triethylamine are dissolved in 200 ml. benzene. Under stirring, there is slowly added dropwise a solution of 33 g. benzoyl chloride in 100 ml. benzene; then the mixture is boiled for ½ hour, cooled, and washed with dilute hydrochloric acid. The benzene phase is concentrated, and the obtained 1-(N-isopropylbenzamido)-4,4-diphenylcyclohexane is recrystallized from ethanol (M.P. 188° C.). The benzoyl compound is dissolved in 800 ml. absolute tetrahydrofuran; this resultant solution is added dropwise to 8 g. lithium aluminum hydride in 200 ml. tetrahydrofuran, boiled for 5 hours, and decomposed with dilute hydrochloric acid. The solvent is distilled off, the residue is mixed with tartaric acid, made alkaline with solution of sodium hydroxide, and extracted with chloroform. After concentration and recrystallization from ethanol, there is obtained 1 - (N - isopropyl - N - benzylamino)-4,4-diphenyl-cyclohexane, M.P. 110° C. Hydrochloride, M.P. 155° C.

EXAMPLE 22

10 g. 4,4-diphenyl-cyclohexen-(2)-one, 5.6 g. pyrrolidine, and 50 ml. tetrahydrofuran are agitated for 12 hours at 160° C. in a tubular bomb. After cooling, the mixture is concentrated, the residue is dissolved in 200 ml. methanol, and hydrogenated after the addition of 4 g. Raney nickel at 6 atmospheres and 60° C. After the catalyst has been vacuum filtered off the mixture is made acidic with hydrochloric acid, and the methanol is distilled off. The remaining 1-pyrrolidino-4,4-diphenyl-cyclohexane-hydrochloride is recrystallized from ethanol/ether, M.P. 244° C.

Analogously, there are obtained, by reacting the corrosponding 4,4-diphenyl-cyclohexen-(2)-ones with the corresponding amines and subsequent hydrogenation, the hydrochlorides of the following 4-4-diphenyl-cyclohexanes:

1-tert.-butylamino-
1-n-amylamino-
1-isoamylamino-
1-pentyl-(2)-amino-
1-pentyl-(3)-amino-
1-neopentylamino-
1-[3-methylbutyl-(2)]-amino-
1-[2-methylbutyl-(1)]-amino-
1-tert.-amylamino-
1-n-hexylamino-
1-isohexylamino-
1-hexyl-(2)-amino-
1-n-heptylamino-
1-cyclopropylamino-
1-cyclobutylamino-
1-cyclopentylamino-
1-cycloheptylamino-
1-cyclooctylamino-
1-[2-phenylethylamino]-
1-[3-phenylpropyl-(1)-amino]-
1-[4-phenylbutyl-(1)-amino]-
1-[4-phenyl-butyl-(2)-amino]-
1-[N-methyl-N-ethylamino]-
1-diethylamino-
1-[N-methyl-N-n-propylamino]-
1-[N-methyl-N-n-butylamino]-
1-[N-methyl-N-isobutylamino]-
1-[N-ethyl-N-n-propylamino]-
1-[N-ethyl-N-isopropylamino]-
1-di-n-propylamino-
1-diisopropylamino-
1-[N-methyl-N-n-amylamino]-
1-[N-methyl-N-isoamylamino]-
1-[N-methyl-N-pentyl-(2)-amino]-
1-[N-methyl-N-pentyl-(3)-amino]-
1-[N-methyl-N-neopentylamino]-
1-[N-methyl-N-3-methylbutyl-(2)-amino]-
1-[N-methyl-N-2-methylbutyl-(1)-amino]-
1-piperidino-
1- 2-methyl-pyrrolidino)-
1-(3-methyl-pyrrolidino)-
1-(2-methyl-piperidino)-
1-[N-methyl-N-sec.-butylamino]-2-ethyl-
1-dimethylamino-2-isopropyl- By dissolving the hydrochlorides in water, addition of dilute solution of sodium hydroxide, and chloroform, agitation, separation, and concentration, the corresponding free bases are obtainable.

EXAMPLE 23

Analogously to Example 1, there are obtained, by hydrogenation of the corresponding 4,4-diaryl-cyclohexen-(2)-one-oximes, the hydrochlorides of the following cyclohexylamines:

2-isobutyl-4,4-diphenyl-
2-sec.-butyl-4,4-diphenyl-
2-n-amyl-4,4-diphenyl-
2-isoamyl-4,4-diphenyl,
4,4-bis-(o-tolyl)-
4,4-bis-(m-tolyl)-
4,4-bis-(o-chlorophenyl)-
4,4-bis-(m-chlorophenyl)-
4,4-bis-(p-chlorophenyl)-
4,4-bis-(o-fluorophenyl)-
4,4-bis-(m-fluorophenyl)-
4,4-bis-(p-fluorophenyl)-
4,4-bis-(o-hydroxyphenyl)-
4,4-bis-(m-hydroxyphenyl)-
4,4-bis-(p-hydroxyphenyl)-
4,4-bis-(o-methoxyphenyl)-
4,4-bis-(m-methoxyphenyl)-
4,4-bis-(p-ethoxyphenyl)-
4,4-bis-(3,4-dimethoxphenyl)-
4,4-bis-(3,4-methylenedioxyphenyl)-
4,4-bis-(3-methoxy-4-hydroxyphenyl)-

EXAMPLE 24

Under stirring, 3 g. zinc powder is introduced into a solution of 5.2 g. 4,4-diphenyl-cyclohexen-(2)-one-oxime in 50 ml. acetic acid. The agitation is continued for an additional 4 hours, and then the mixture is filtered, diluted with water, made alkaline with ammonia, and extracted with chloroform. After the solvent has been distilled off, there is obtained 1-amino-4,4-diphenyl-cyclohexene-(2), B.P. 158–160° C./0.05 mm.

EXAMPLE 25

A solution of 5.6 g. 1-nitro-4,4-diphenyl-cyclohexane (obtained from 4,4-diphenyl-cyclohexyl iodide and silver nitrite) in 100 ml. hot ethanol is mixed with a solution of 15 g. sodium dithionite in 60 ml. water. The mixture is boiled for one hour, filtered, and diluted with water. After the alcohol has been distilled off, the mixture is extracted with chloroform, dried, concentrated, and the obtained 4,4 - diphenyl-cyclohexylamine is recrystallized from ethanol, M.P. 100° C.

EXAMPLE 26

A solution of 8.1 g. 4,4-diphenyl-cyclohexyl chloride and 3.6 g. isopropylamine in 50 ml. toluene is boiled until there is no further precipitation of isopropylamine-hydrochloride. The reaction solution is cooled, filtered, and the filtrate is extracted with dilute hydrochloric acid; then a working up operation is conducted as in Example 6. There is obtained 1-isopropylamino-4,4-diphenyl-cyclohexane, B.P. 164–165° C./0.05 mm.

EXAMPLE 27

100 mg. 4,4-bis-(p-methoxyphenyl)-cyclohexylamine are boiled for 2 hours with 2 ml. 48% hydrobromic acid. Subsequently, the excess hydrobromic acid is distilled off under vocuum. The residue consists of the hydrobromide of 4,4-bis-(p-hydroxyphenyl)-cyclohexylamine.

EXAMPLE 28

(a) Analogously to Example 7, 4,4-diphenyl-cyclohexen-(2)-one is reacted with benzylamine to form the Schiff base, and subsequently hydrogenated in contact with platinum oxide to 1-benzylamino-4,4-diphenyl-cyclohexane.

(b) 2 g. crude 1-benzylamino-4,4-diphenyl-cyclohexane are dissolved in 20 ml. methanol and hydrogenated, after the addition of 200 mg. 5% palladium charcoal, at room temperature and normal pressure until the reaction ceases. A working-up step as in Example 6 is conducted, and there is obtained 4,4-diphenyl-cyclohexylamine-hydrochloride, M.P. 260° C.

EXAMPLE 29

1 g. 1-phthalimido-2-allyl-4,4-diphenyl-cyclohexane is boiled for 6 hours with 10 ml. concentrated hydrochloric acid. The larger portion of the hydrochloric acid is distilled off; the mixture is made alkaline with a solution of sodium hydroxide, and the base is then extracted with ether. After the ethereal solution has been dried, ethereal hydrochloric acid is added; the mixture is filtered off, and the thus-obtained 2-allyl-4,4-diphenyl-cyclohexyl-amine-hydrochloride is recrystallized from ethanol.

The starting material is obtained from 2-allyl-4,4-diphenyl-cyclohexanone by way of 2-allyl-4,4-diphenyl-cyclohexanol and 2-allyl-4,4-diphenyl-cyclohexyl bromide.

The reaction of 1-phthalimido-2-allyl-4,4-diphenyl-cyclohexane with bromine in chloroform at 0° C. yields the dibromide wherefrom there is obtained, by 5 hours' boiling with 4 N-ethanolic potassium hydroxide solution, 1-phthalimido-2-propargyl-4,4-diphenyl-cyclohexane; from the latter compound, 2-propargyl-4,4-diphenyl-cyclohexylamine-hydrochloride is produced with hydrochloric acid, as set out above.

The following examples are such for suitable pharmaceutical preparations. The figures given are parts by weight.

Example A.—Tablets

| | |
|---|---|
| 1-isopropylamino-4,4-diphenyl-cyclohexane hydrochloride | 5 |
| Lactose | 90 |
| Corn starch | 18 |
| Talc | 7 | are thoroughly mixed. The powder obtained is processed into tablets in such a manner that each tablet contains 5 mg. of the active ingredient.

Example B.—Coated tablets

| | |
|---|---|
| 1-isopropylamino-4,4-diphenyl-cyclohexane hydrochloride | 5 |
| Lactose | 93 |
| Talc | 2 | are thoroughly mixed and processed into tablets each containing 5 mg. of the active ingredient. These tablets are coated with sugar syrup in the customary manner until the total weight of one coated tablet is 200 mg.

Example C.—Solution for injections

A solution of 1 part of 1-isoproylamino-4,4-diphenyl-cyclohexane-hydrochloride in 999 parts of distilled water is prepared and filled into 1 ml. ampoules in such a manner that each ampoule contains 1 mg. of the active ingredient.

Example D.—Syrup

The unit dosage contains:

| | Mg. |
|---|---|
| 1-isopropylamino-4,4-diphenyl-cyclohexane-hydrochloride | 15 |
| Sugar | 300 |
| Glycerol (twice distilled) | 500 |
| Methyl p-hydroxybenzoate | 3.3 |
| Propyl p-hydroxybenzoate | 1.7 |
| Flavor—as desired. | |
| Water distilled | 4200 |

Example E.—Suppositories

Each suppository contains:

| | |
|---|---|
| 1-isopropylamino-4,4-diphenyl-cyclohexane-hydrochloride mg | 10 |
| Cocoa butter g | 2 |

Instead of 1-isopropylamino-4,4-diphenyl-cyclohexane hydrochloride, other physiologically compatible salts of 1-isopropylamino-4,4-diphenyl-cyclohexane or the free base itself can be incorporated into similar pharmaceutical preparations.

Instead of 1-isopropylamino-4,4-diphenyl-cyclohexane, other compounds of Formula I as described above can be used.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A member selected from the group consisting of a 4,4-diphenyl-cyclohexylamine of the following formula, an acid addition salt thereof and quaternary ammonium compound thereof:

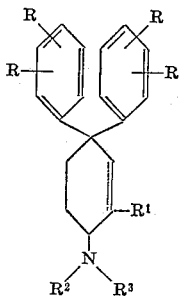

wherein:
R represents hydrogen, alkyl of 1–4 carbon atoms, methoxy, ethoxy, hydroxy, chlorine or two R groups on the same phenyl nucleus represent methylene dioxy, $R^1$ represents hydrogen, alkyl of up to 6 carbon atoms, alkenyl of up to 6 carbon atom or alkynyl of up to 6 carbon atoms with the provision that $R^1$ cannot be said alkenyl or said alkynyl when R represents methoxy, ethoxy, hydroxy, chlorine or methylenedioxy; and $R^2$ and $R^3$ each represents hydrogen, alkyl of up to 8 carbon atoms, alkenyl of up to 8 carbon atoms, cycloalkyl of 3–8 carbon atoms, phenylalkyl of which the alkyl portion is of up to 4 carbon atoms or substituted phenylalkyl of which the alkyl portion is of up to 4 carbon atoms and the phenyl portion is substituted by R in the same manner as the 4-position phenyl groups or $R^2$ and $R^3$ together with the nitrogen atom affixed thereto represent pyrrolidino, piperidino, methyl pyrrolidino, methyl piperidino, ethyl pyrrolidino or ethyl piperidino; and the dashed line in the formula represents the optional presence of a double bond.

2. The member as defined by claim 1 wherein:
R is hydrogen or p-methoxy;
$R^1$ is hydrogen or alkyl of 1–4 carbon atoms;
$R^2$ is hydrogen or alkyl of 1–4 carbon atoms;
$R^3$ is hydrogen, alkyl of 1–8 carbon atoms or cyclohexyl; and
the dashed line in the formula does not represent a double bond.

3. The member as defined by claim 1 wherein:
R represents hydrogen;
$R^1$ is hydrogen or $CH_3$;
$R^2$ is hydrogen or $CH_3$;
$R^3$ is hydrogen or alkyl of 1–5 carbon atoms; and
wherein the dashed line in the formula does not represent a double bond.

4. The member as defined by claim 1 wherein said member is 4,4-diphenyl-cyclohexylamine.

5. The member as defined by claim 1 wherein said member is 1-ethylamino-4,4-diphenyl-cyclohexane.

6. The member as defined by claim 1 wherein said member is 1-isopropylamino-4,4-diphenyl-cyclohexane.

7. The member as defined by claim 1 wherein said member is 1-sec.-butylamino-4,4-diphenyl-cyclohexane.

8. The member as defined by claim 1 wherein said member is 1-[N-methyl-N-isopropylamino]-4,4-diphenyl-cyclohexane.

9. The member as defined by claim 1 wherein said member is 1-[N-methyl-N-sec.-butylamino]-4,4-diphenyl-cyclohexane.

10. The member as defined by claim 1 wherein said member is 1-pyrrolidino-4,4-diphenyl-cyclohexane.

11. The member as defined by claim 1 wherein said member is 2-methyl-4,4-diphenyl-cyclohexylamine.

12. The member as defined by claim 1 wherein said member is 1-dimethylamino-2-methyl-4,4-diphenyl-cyclohexane.

13. The member as defined by claim 1, wherein $R^1$ represents hydrogen or alkyl of up to 6 carbon atoms.

14. The member as defined by claim 1, wherein R represents hydrogen.

15. The member as defined by claim 1 wherein said member is 1-(2-p-tolylethylamino)-4,4-diphenyl-cyclohexane.

16. The member as defined by claim 1 wherein said member is 1-[2-(3 - hydroxy-4-methoxyphenyl) - ethylamino]-4,4-diphenyl-cyclohexane.

17. The member as defined by claim 1 wherein said member is 1-(N-isopropyl-N-benzylamino)-4,4-diphenyl-cyclohexane.

References Cited

UNITED STATES PATENTS 3,285,960  11/1966  Halverstadt _____ 260—570

ALEX MAZEL, *Primary Examiner.*

J. TOVAR, *Assistant Examiner.*